United States Patent
Suzuki et al.

(10) Patent No.: US 9,734,931 B2
(45) Date of Patent: Aug. 15, 2017

(54) POWER-SUPPLY CABLE AND APPARATUS FOR MANUFACTURING ELECTRIC WIRE USED FOR SAID POWER-SUPPLY CABLE

(71) Applicant: HITACHI METALS, LTD., Tokyo (JP)

(72) Inventors: Tomohisa Suzuki, Tokyo (JP); Takeshi Terasaki, Tokyo (JP); Fumihito Oka, Hitachi (JP); Hirotaka Eshima, Hitachi (JP); Naofumi Chiwata, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 253 days.

(21) Appl. No.: 14/462,982

(22) Filed: Aug. 19, 2014

(65) Prior Publication Data

US 2015/0083489 A1    Mar. 26, 2015

(30) Foreign Application Priority Data

Sep. 24, 2013 (JP) ................................. 2013-196499

(51) Int. Cl.
*H01R 9/05* (2006.01)
*H02G 15/04* (2006.01)
(Continued)

(52) U.S. Cl.
CPC .............. *H01B 3/30* (2013.01); *H01B 13/345* (2013.01); *B60R 16/02* (2013.01); *H01B 13/008* (2013.01); *Y10T 29/5187* (2015.01)

(58) Field of Classification Search
CPC .... Y10T 29/5187; H01B 13/345; H01B 3/30; H01B 13/008; H01B 13/0858;
(Continued)

(56) References Cited

U.S. PATENT DOCUMENTS

2004/0158128 A1    8/2004  Fujikawa et al.
2010/0214760 A1*   8/2010  Matsukawa ......... H04M 1/0237
                                                      361/826
(Continued)

FOREIGN PATENT DOCUMENTS

| GB | 1448799 A | * 9/1976 | ............. H01B 7/365 |
| JP | 10-067467 A | 3/1998 | |
| JP | 2014-101736 A | 4/2004 | |

OTHER PUBLICATIONS www.king-cart _pages 1-7_Nov. 2011.*

*Primary Examiner* — Timothy Thompson
*Assistant Examiner* — Guillermo Egoavil
(74) *Attorney, Agent, or Firm* — Mattingly & Malur, PC (57) ABSTRACT

It is an objective of the invention to provide a high-power supply cable characterized in that even when mounted in a narrow space where the cable undergoes a repetitive bending motion, any undesirable deformation out of the bending plane is small. There is provided a power-supply cable including: an electric wire including an electrical conductor and a resin sheath covering the electrical conductor, the electric wire having a tendency to generate a curl under a no-load condition, the curl having a curling direction, the curling direction being a normal to the curl, the electric wire having one or more longitudinal ends; a connecting terminal disposed at one of the longitudinal ends of the electric wire; and a curling tendency direction indicator showing the curling direction, the indicator being disposed along a normal line to the curl of the electric wire.

2 Claims, 4 Drawing Sheets

(51) Int. Cl.
*H02G 15/013* (2006.01)
*H01B 3/30* (2006.01)
*H01B 13/34* (2006.01)
B60R 16/02 (2006.01)
H01B 13/008 (2006.01)

(58) Field of Classification Search
CPC .... H01B 9/006; H01B 13/0026; H01B 7/368; H01B 7/0892; H01B 11/203; H01B 13/012; H01B 13/34; B60R 16/02; B60R 16/0207; B60R 16/0215; B62D 65/18; G06K 7/12; G06Q 50/00; G06Q 50/04; H02G 11/00; H04M 1/0237; Y02P 90/30
USPC ...... 29/33 F; 174/74 R; 235/375; 340/572.8; 361/826; 439/488
See application file for complete search history.

(56) References Cited

U.S. PATENT DOCUMENTS

2012/0168225 A1* 7/2012 Satou ................ B60N 2/06
 174/70 R
2013/0207715 A1* 8/2013 Salo ................. G06F 3/016
 327/517

* cited by examiner

POWER-SUPPLY CABLE AND APPARATUS FOR MANUFACTURING ELECTRIC WIRE USED FOR SAID POWER-SUPPLY CABLE

CLAIM OF PRIORITY

The present application claims priority from Japanese patent application serial no. 2013-196499 filed on Sep. 24, 2013, the content of which is hereby incorporated by reference into this application.

FIELD OF THE INVENTION

The present invention relates to power-supply cables, and particularly to a power-supply cable characterized in that even when mounted in a narrow space where the cable undergoes a repetitive bending motion, any undesirable deformation out of the bending motion is small. Also, the present invention relates to an apparatus for manufacturing an electric wire used for the power-supply cable.

DESCRIPTION OF RELATED ART

With today's strong demand for global environment conservation and energy saving, electric vehicles (EVs) and fuel cell electric vehicles (FCEVs) that utilize an electric motor as a primary power source are being actively researched and developed. Two types of drive mechanisms have been proposed for such vehicles: first one in which a conventional internal combustion engine is merely replaced by an electric motor, and second one in which each wheel is directly driven by an electric motor mounted inside the wheel (known as "in-wheel motor system"). The in-wheel motor system draws attention as a very unique drive mechanism since the conventional engine space is not required and each wheel can be independently driven.

Figure 1:
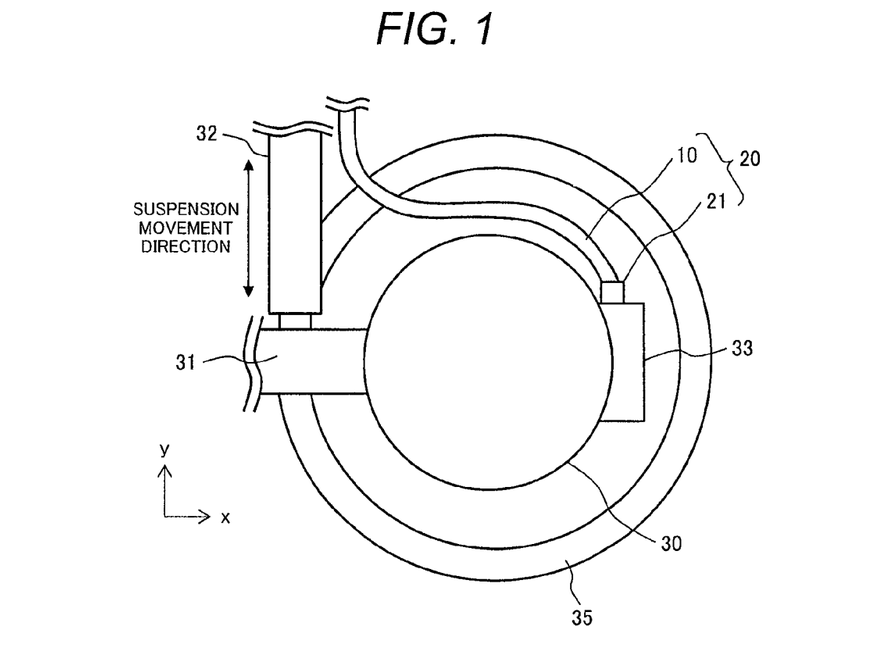
FIG. 1 is a schematic illustration showing a side view of an inside of an example of a vehicle wheel accommodating an in-wheel motor, as seen from a lateral outside of the wheel into an inside.
Figure 2:
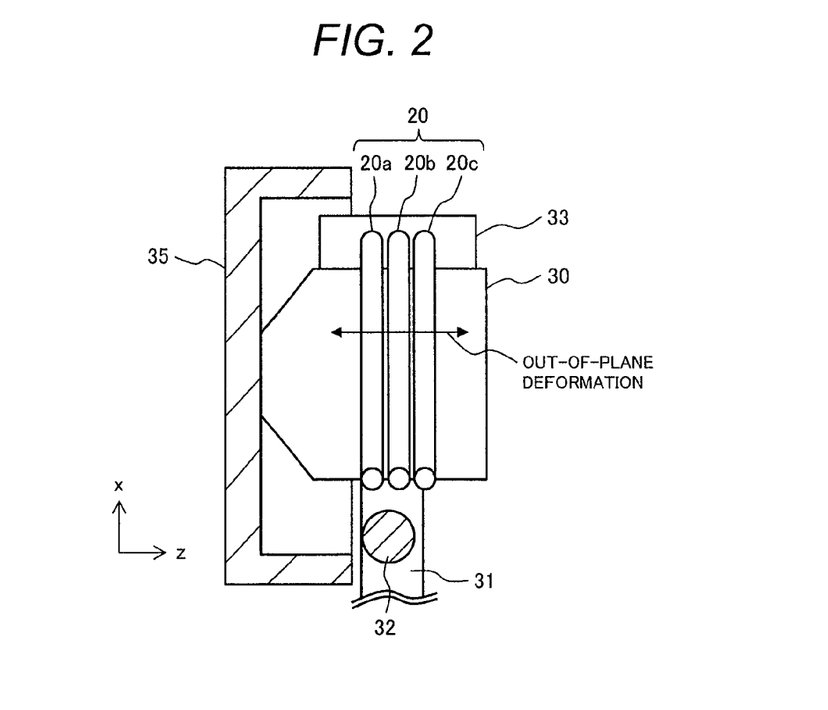
FIG. 2 is a schematic illustration showing a top view of the vehicle wheel of FIG. 1, as seen from an upper outside of the wheel down into the inside along a y-axis in FIG. 1.

The in-wheel motor system will be briefly explained below. FIG. 1 is a schematic illustration showing a side view of an inside of an example of a vehicle wheel accommodating an in-wheel motor, as seen from a lateral outside of the wheel into an inside. FIG. 2 is a schematic illustration showing a top view of the vehicle wheel of FIG. 1, as seen from an upper outside of the wheel down into the inside along a y-axis in FIG. 1. As illustrated in FIGS. 1 and 2, an in-wheel motor 30 and a suspension 32 are mounted on a suspension arm 31. The in-wheel motor 30 is disposed such that a rotation axis of the in-wheel motor 30 is the rotation axis of the wheel 35.

The in-wheel motor 30 is required to be sufficiently small to be mounted in a narrow space of the vehicle wheel 35 and is also required to generate a sufficiently high power to drive the vehicle. So, usually, a 3-phase AC motor is used as the in-wheel motor 30. In order to supply power to the 3-phase in-wheel motor 30, plural power-supply cables 20 (for example, 20a to 20c in FIG. 2) are connected to the in-wheel motor 30 via connecting terminals 21 and a terminal box 33. Thus, the plural power-supply cables 20 for supplying electric power to the in-wheel motor 30 need to be disposed in a narrow space.

The power-supply cables 20 undergo, during the vehicle driving, etc., a repetitive bending motion caused by the movement of the suspension 32 (for example, see FIG. 1). It is very important to dispose the power-supply cables 20 so that the cables 20 never receive an excessive tensile stress caused by such bending. Also important is to prevent the power-supply cables 20 from touching any other components around the in-wheel motor 30 (such as the suspension 32, the wheel 35, and an unshown wheel housing).

The in-wheel motor vehicle is still under research and development and many of the technological problems remain unsolved.

In previously-performed driving tests, the power-supply cable 20 of the in-wheel motor 30 sometimes unexpectedly touched another component around the in-wheel motor 30. This means that when the power-supply cable 20 underwent a repetitive bending motion caused by the suspension 32 movement, the cable 20 deformed in a direction out of the bending plane (the x-y plane in FIG. 1). For example, the power-supply cable 20 deformed along the arrow direction in FIG. 2. This type of deformation is hereinafter referred to as an "out-of-plane deformation". Such accidental touching of any other component around the in-wheel motor 30 by the power-supply cable 20 must be prevented by all means because it may potentially lead to a breakage of the cable 20 over time.

The present inventors tested on various power-supply cables 20 and then found that the direction and amount of the out-of-plane deformation varied from cable to cable; that is, there was no consistent tendency. That is, it was difficult to solve the problem of the out-of-plane deformation and its cable-to-cable variation because the cause of the problem was not understood.

SUMMARY OF THE INVENTION

In view of the foregoing, it is an objective of the present invention to clarify the cause of the out-of-plane deformation of power-supply cables and the cable-to-cable variation. Another objective is to provide a high-power supply cable characterized in that even when mounted in a narrow space where the cable undergoes a repetitive bending motion, any undesirable deformation out of the bending plane is small. Still another objective is to provide an apparatus for manufacturing an electric wire used for such a power-supply cable of the invention.

(I) According to one aspect of the present invention, there is provided a power-supply cable including:

an electric wire including an electrical conductor and a resin sheath covering the electrical conductor, the electric wire having a tendency to generate a curl under a no-load condition, the curl having a curling direction, the curling direction being a normal to the curl, the electric wire having one or more longitudinal ends;

a connecting terminal disposed at one of the longitudinal ends of the electric wire; and a curling tendency direction indicator showing the curling direction, the indicator being disposed along a normal line to the curl of the electric wire.

In the above aspect (I) of the invention, the following modifications and changes can be made.

(i) The curling tendency direction indicator is disposed on a surface of the resin sheath.

(ii) The curling tendency direction indicator is disposed on a surface of the connecting terminal.

(II) According to another aspect of the present invention, there is provided an apparatus for manufacturing an electric wire used for the power-supply cable of the invention, the apparatus including:

a bobbin for winding the electric wire;

a bobbin drive mechanism for rotating the bobbin; and a printer configured operable to dispose the curling tendency direction indicator, the printer printing the curling tendency direction indicator on the surface of the resin sheath immediately before and/or immediately after the electric wire is wound around the bobbin.

In the above aspect (II) of the invention, the following modifications and changes can be made.

(iii) The electric wire wound around the bobbin has a cross section intersecting the curling tendency direction indicator, the bobbin has a winding surface and has a normal line to the winding surface as viewed from the cross section of the electric wire, and the curling tendency direction indicator is disposed along the normal line of the bobbin.

(iv) The bobbin is detachable from the manufacturing apparatus, and is a bobbin for storing the electric wire manufactured.

Advantages of the Invention

According to the present invention, it is possible to provide a power-supply cable (used for high-power electrical equipment such as high-power 3-phase AC motors) characterized in that even when mounted in a narrow space where the cable undergoes a repetitive bending motion, any undesirable deformation out of the bending motion is small. Also possible is to provide an apparatus for manufacturing an electric wire used for such a power-supply cable of the invention.

DETAILED DESCRIPTION OF THE PREFERRED EMBODIMENTS (Primary Motivation for the Present Invention)

As mentioned above briefly, it has been observed that when a bending motion is exerted on power-supply cables, the direction and amount of the out-of-plane deformation vary considerably from cable to cable. The present inventors have investigated the cause of this phenomenon by tracking as far back as to their manufacturing processes.

Electric wires for power-supply cables are manufactured to be far longer than actually needed, so they are usually stored by being wound around a bobbin (or drum) until just prior to use. When use, electric wires are cut out from a long wire stored on a bobbin/drum and are subjected to an end treatment to form power-supply cables. Here, the electric wires sometimes still have a deformation tendency caused by the winding. Such a deformation tendency of electric wires is thought to be attributed to the viscoelasticity of the resin insulating material and the resin sheath material used for the electric wires. Probably, the deformation tendency depends on the insulating/sheath materials, the storage period, and the bobbin/drum diameter.

Herein, the deformation tendency of an electric wire means the curling tendency of the electric wire caused by being wound around a bobbin/drum (hereinafter, referred to as the "curling tendency" or "tendency to curl".

The curling tendency of an electric wire may potentially affect the out-of-plane deformation and its cable-to-cable variation. So, a search of the prior art relating to the curling tendencies of electric wires was conducted.

For example, JP 2004-101736 A discloses an endoscope device including a flexible portion. The flexible portion includes: a thin and long flexible insertion portion; a gripping portion connected to a base end of the insertion portion; and a universal cable connected to the gripping portion. When encased, the flexible portion is curled into plural loops and concentrically and spirally folded generally in the same plane. The loops of the insertion portion preferably have a tendency to curl in the same direction. The loops of the universal cable preferably have a tendency to curl in the same direction. According to this JP 2004-101736 A, the flexible portion of the endoscope can be more readily and neatly encased.

JP Hei 10 (1998)-67467 A discloses an electric relay between relatively rotatable members, the electric relay including: a first rotatable inner cylinder; a second rotatable outer cylinder surrounding the first cylinder with an annular space therebetween, the second rotatable outer cylinder being rotatable relative to inner cylinder; and a plurality of flat cables disposed inside the annular space, an inner end of each flat cable being supported by the first inner cylinder and an outer end of each flat cable being supported by the second outer cylinder. Each flat cable has a tendency to curl along an outer surface of the first inner cylinder. According to this JP Hei 10 (1998)-67467 A, because the flat cables have the curling tendency to curl along the outer surface of the first inner cylinder, they do not bend or swell outward; thus they do not touch each other. When the flexible cables touch each other as conventionally sometimes occurred, friction occurs between them, thereby increasing compression stress in each cable and causing buckling. The JP Hei 10 (1998)-67467 A prevents such flexible flat cable buckling problem.

The above JP 2004-101736 A and JP Hei 10 (1998)-67467 A, respectively, improves a cable's foldability and prevents a cable's buckling problem by utilizing the curling tendency of the cable, but do not describe or suggest anything about the out-of-plane deformation of cables having a curling tendency and its cable-to-cable variation. It should be additionally noted that a flexible flat cable as described in the above JP Hei 10 (1998)-67467 A never suffer any out-of-plane deformation because of an intrinsic structural reason. It should be also noted that typical flexible flat cables cannot handle high power and therefore cannot be used for high-power 3-phase AC motors for electric vehicles.

In view of the foregoing, the inventors have researched and investigated in further detail the direction and amount of the out-of-plane deformation of power-supply cables including an electric wire having a curling tendency, and have found the following results. The direction and amount of the out-of-plane deformation are strongly affected by the angle between the curling tendency direction of the electric wire and the bending motion direction of the power-supply cable. The term "the curling tendency direction of an electric wire", as used herein, means "a normal to the curl (curling curve) that the electric wire tends to generate. That is, by adjusting the curling tendency direction of the electric wire used for a power-supply cable and the direction of the bending motion exerted on the power-supply cable, the out-of-plane deformation of the cable and its cable-to-cable variation can be reduced. The present invention is based on this new finding.

Preferred embodiments of the present invention will be described below in more detail with reference to the accompanying drawings. However, the invention is not limited to the specific embodiments described below, but various combinations and modifications are possible without departing from the spirit and scope of the invention.

(Power-Supply Cable)

Figure 3:
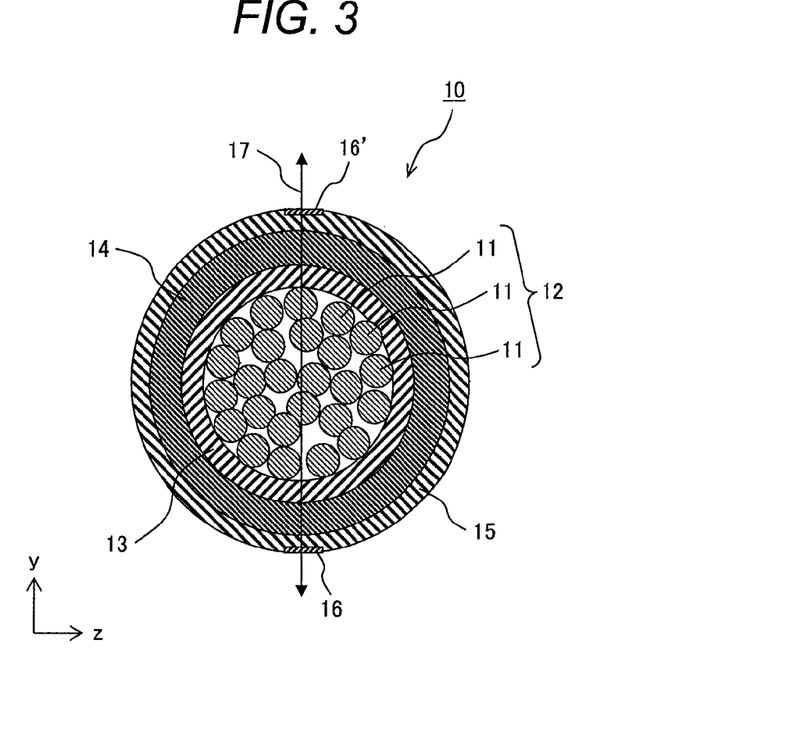
FIG. 3 is a schematic illustration showing a cross sectional view of an example of a power-supply cable of the invention.
Figure 4:
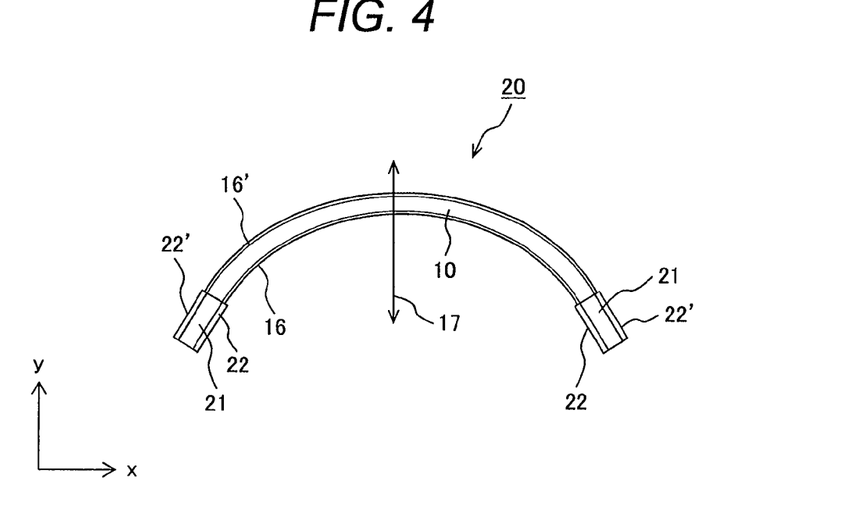
FIG. 4 is a schematic illustration showing a plane view of an example of a power-supply cable of the invention.

FIG. 3 is a schematic illustration showing a cross sectional view of an example of a power-supply cable of the invention. FIG. 4 is a schematic illustration showing a plane view of an example of a power-supply cable of the invention. As illustrated in FIGS. 3 and 4, a power-supply cable 20 of the invention includes an electric wire 10 and a connecting terminal 21 provided at a longitudinal end of the electric wire 10. The electric wire 10 includes: a central conductor 12; an insulating layer 13 on the central conductor 12; a reinforcing braiding layer 14 on the insulating layer 13; and a resin sheath 15 on the braiding layer 14. The electric wire 10 tends to curl in a certain direction under a no-load condition. Curling tendency direction indicators 16 and 16' showing the curling tendency direction of the electric wire 10 are provided on a surface of the resin sheath 15 along a normal line 17 to the curl (curling curve) that the electric wire 10 tends to generate.

The power-supply cable 20 of the invention has the curling tendency direction indicators showing the direction in which the electric wire 10 tends to curl. Therefore, the direction in which the electric wire 10 tends to curl and the direction of the bending motion exerted on the power-supply cable 20 can be easily adjusted. As a result, even when a repetitive bending motion is exerted on the power-supply cable 20, the out-of-plane deformation and its cable-to-cable variation can be reduced. The direction in which the electric wire 10 tends to curl (the curling tendency direction), a relationship between the curling tendency direction and the bending motion direction, and the out-of-plane deformation of the power-supply cable 20 will be described later in more detail.

There is no particular limitation on the curling tendency direction indicators 16 and 16' so long as the normal line 17 to the curl (curling curve) that the electric wire 10 tends to generate can be recognized from the outside. For example, lines, marks, figures, grooves, and protrusions may be used. Of these, line marks formed on the surface of the resin sheath 15 of the electric wire 10 are preferable because of the simple structure and the low manufacturing cost.

When the curling tendency direction indicator is provided at two locations such as the indicators 16 and 16' in FIG. 3, it is preferable in terms of handling that the outside and inside indicators are distinguishable. For example, the two indicators may have different line widths or different colors. It should be noted that the invention need not necessarily have the two curling tendency direction indicators, but may have either one of them.

Preferably, as illustrated in FIG. 4, the connecting terminal 21 also has, on its surface, curling tendency direction indicators 22 and 22' showing the curling tendency direction of the electric wire 10 (normal vectors 17 to the curl (curling curve) that the electric wire 10 tends to generate). Here, the connecting terminal 21 may be first provided with the curling tendency direction indicators 22 and 22' beforehand and then fixed to the power-supply cable 20 in such a manner that the indicators 22 and 22' align with the curling tendency direction indicators 16 and 16' of the electric wire 10. Or, the connecting terminal 21 may be first fixed to the electric wire 10 and then provided with the curling tendency direction indicators 22 and 22' in such a manner that the indicators 22 and 22' align with the curling tendency direction indicators 16 and 16' of the electric wire 10.

The cross-sectional structure of the electric wire 10 is not limited to the one illustrated in FIG. 3, but other cross-sectional structures may be possible so long as the electric wire 10 includes at least the central conductor 12 and the outermost resin sheath 15. The term "setting an electric wire under a no-load condition", as used herein and in the appended claims, means "carefully placing the electric wire on a plate with a smallest possible surface friction (e.g., on a polished surface of a polytetrafluoroethylene (PTFE) plate or a polished surface an ice plate).

The central conductor 12 of the invention is preferably a stranded conductor formed by twisting a plurality of element wires 11. Stranded conductors generally have an advantage of having a high bending strength since a bending force exerted on a stranded conductor is equally distributed among the element wires. Although the number of the element wires is illustrated as being 29 in FIG. 3, there is no limitation on the number.

Thicknesses and materials of the insulating layer 13, reinforcing braiding layer 14 and resin sheath 15 are not particularly limited, but may be properly chosen in consideration of the specification of an electrical device (e.g., the in-wheel motor 30) to which the power-supply cable 20 is to be connected. For example, a 0.5-mm thick polyethylene (PE) insulating layer 13, a 1.0-mm thick polyethylene terephthalate (PET) reinforcing braiding layer 14 and a 0.8-mm thick ethylene-propylene-diene rubber (EPDM) resin sheath 15 may be formed in this order on a 3.4-mm diameter central conductor 12.

(Manufacturing Apparatus of Electric Wire for Power-Supply Cable)

Figure 5:
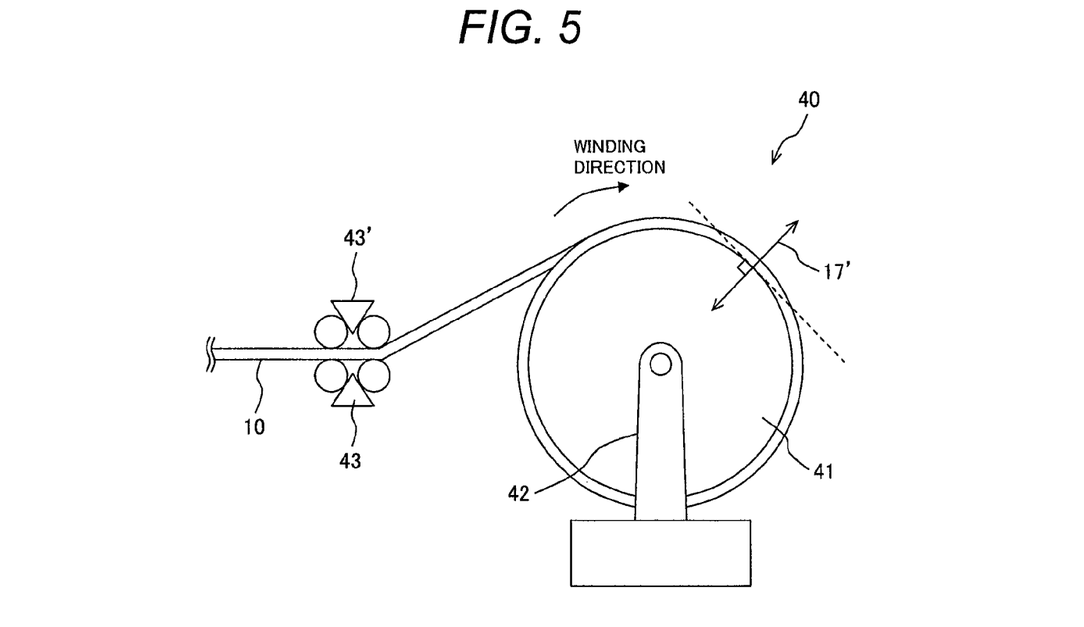
FIG. 5 is a schematic illustration showing a side view of an example of a manufacturing apparatus for manufacturing an electric wire used for a power-supply cable of the invention.

FIG. 5 is a schematic illustration showing a side view of an example of a manufacturing apparatus for manufacturing an electric wire used for a power-supply cable of the invention. As illustrated in FIG. 5, a manufacturing apparatus 40 for manufacturing an electric wire used for a power-supply cable of the invention includes a bobbin 41 for winding the electric wire 10, a drive 42 for rotating the bobbin 41, and printers 43 and 43' configured operable to dispose the curling tendency direction indicators. The printers 43 and 43' print the curling tendency direction indicators 16 and 16' on the surface of the resin sheath 15 immediately before the electric wire 10 is wound around the bobbin 41. The curling tendency direction indicators 16 and 16' are printed on the surface of the resin sheath 15 along the normal line 17' to the winding surface of the bobbin 41 (as seen from the cross section of the electric wire 10 intersecting the indicators 16 and 16' after the electric wire 10 is wound around the bobbin 41).

Figure 6:
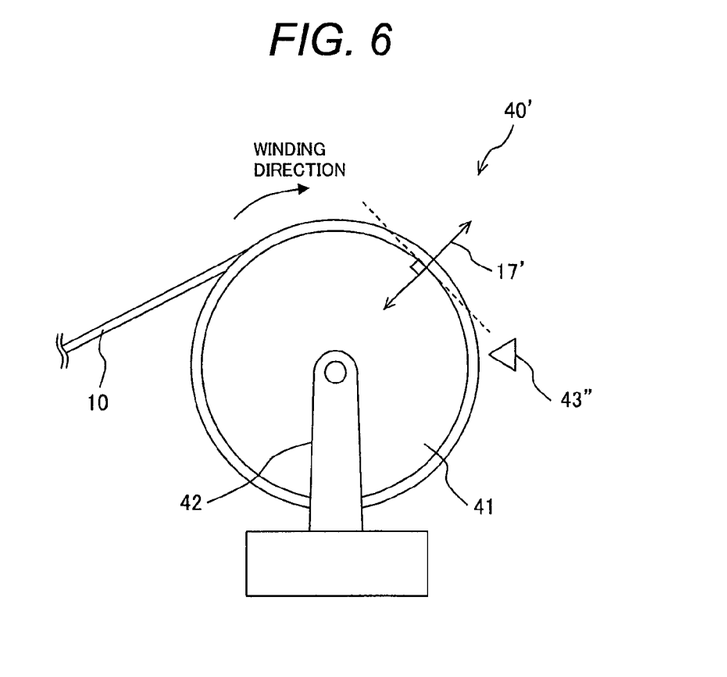
FIG. 6 is a schematic illustration showing a side view of another example of a manufacturing apparatus for manufacturing an electric wire used for a power-supply cable of the invention.

FIG. 6 is a schematic illustration showing a side view of another example of a manufacturing apparatus for manufacturing an electric wire used for a power-supply cable of the invention. The FIG. 6 manufacturing apparatus 40' for manufacturing an electric wire used for a power-supply cable is different from the FIG. 5 manufacturing apparatus 40 in that a printer 43" is disposed instead of the printer 43' and that the printer 43" prints the curling tendency direction indicator 16' on the surface of the resin sheath 15 immediately after the electric wire 10 is wound around the bobbin 41. The FIG. 6 manufacturing apparatus 40' may have or not have the printer 43.

It is desirable that the manufacturing apparatus 40 or 40' for manufacturing an electric wire used for a power-supply cable of the invention be used at the final manufacturing step of the electric wire 10 used for a power-supply cable (immediately before the finished electric wire 10 is stored). It is also desirable that the bobbin 41 for winding the electric wire 10 be detachable from the manufacturing apparatus 40 or 40', and be also used as a bobbin for storing the electric wire 10 manufactured. This is because the curling tendency of the electric wire 10 is generated during storing; otherwise the electric wire 10 may suffer another curling tendency different from one indicated by the curling tendency direction indicator 16 or 16'.

(In-Wheel Motor)

As described above, the invention's power-supply cable 20 including the electric wire 10 has the curling tendency direction indicator(s) showing the direction in which the electric wire 10 tends to curl. Therefore, the curling tendency direction of the electric wire 10 and the bending motion direction of the power-supply cable 20 can be easily adjusted. As a result, even when a repetitive bending motion is exerted on the power-supply cable 20, the out-of-plane deformation and its cable-to-cable variation can be reduced. By using the power-supply cable 20 of the invention, there is provided an in-wheel motor 30 in which the power-supply cable 20 does not touch the wheel 35 or the tire during driving of a vehicle (see FIGS. 1 and 2).

EXAMPLES

The invention will be described more specifically below by way of examples. However, the invention is not limited to the specific examples below.

(Preparation of Power-Supply Cable and Measurement of Out-of-Plane Deformation)

First, an electric wire 10 as illustrated in FIG. 3 was prepared. In EXAMPLES described here, an uncut 8.0-mm outer diameter long electric wire 10 was prepared by forming a 0.5-mm thick PE insulating layer 13, a 1.0-mm thick PET reinforcing braiding layer 14 and a 0.8-mm thick EPDM resin sheath 15 in this order on a 3.4-mm diameter central conductor 12 (29 element wires, 51-mm twist pitch). Then, by using the manufacturing apparatus 40 in FIG. 5, curling tendency direction indicators 16 and 16' were printed on the surface of the EPDM resin sheath 15 in such a way to correspond to the curling tendency direction of the electric wire 10.

Next, in order to prepare a power-supply cable 20, the long uncut electric wire 10 was unwound from a bobbin 42 and the unwound electric wire 10 was cut out in such a manner that after the connecting terminals 21 were fixed to the opposite ends of the cut electric wire 10, the distance between the connecting terminals 21 was 160 mm. The as-cut electric wire 10 suffered a tendency to curl affected by the storage by winding around the bobbin 42. The curvature radius of the curl was about 100 mm. Then, the cut-out electric wire 10 was subjected to a straightening treatment in order to correct the curling tendency. The resulting electric wire 10 appeared to become almost free from any curling tendency. Finally, the opposite ends of the cut electric wire 10 were subjected to an end treatment, and then connecting terminals 21 were fixed to the opposite ends. Thereby, the preparation of the power-supply cable 20 was completed.

Figure 7:
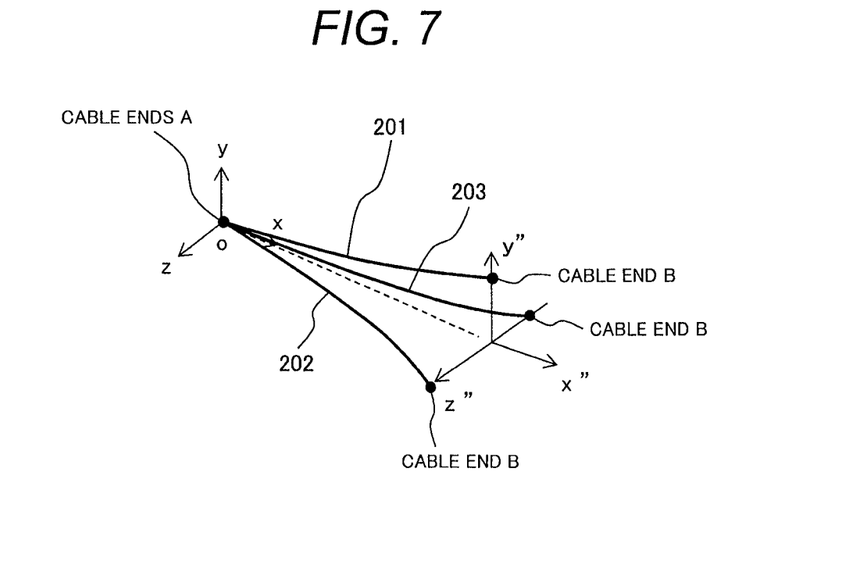
FIG. 7 is a diagram explaining a relationship between the curling tendency directions of electric wires used for power-supply cables and an L-bending plane (x-y plane) of the power-supply cables.

Next, the measurement of the out-of-plane deformation of power-supply cables will be explained. FIG. 7 is a diagram explaining a relationship between the curling tendency directions of electric wires used for power-supply cables and an L-bending plane (x-y plane) of the power-supply cables. In FIG. 7, ends (cable ends A) of the power-supply cables are fixed at the coordinate origin O. The other ends (cable ends B) are left free (e.g., not clamped with a chuck or the like). Under this condition, the power-supply cables are very clearly affected by the curling tendency of the electric wires.

A more detailed description will be made below. For the power-supply cable 201, the electric wire is set in such a manner that the curling tendency direction lies in the x-y plane. In this case, the free cable end B of the cable 201 moves to a positive y-axis (y"-axis) position. This setting is defined as the 0° setting. For the power-supply cable 202, the electric wire is set in such a manner that the curling tendency direction lies in the x-z plane. In this case, the free cable end B of the cable 202 moves to a positive z-axis (z"-axis) position. This setting is defined as the 90° setting. For the power-supply cable 203, the electric wire is set in such a manner that the curling tendency direction lies in the x-z plane. In this case, the free cable end B of the cable 203 moves to a negative z-axis (z"-axis) position. This setting is defined as the 270° setting.

In the out-of-plane deformation measurement, each power-supply cable was first forced to be positioned along the x-axis (x-x" line) and then be L-bent within the x-y plane by gripping the cable ends B with a chuck. Then, the maximum displacement of the electric wire 10 of the power-supply cable in the out-of-plane direction (z-axis direction) was measured. Table 1 shows the measurement result (the relationship between the setting angle of each power-supply cable and the out-of-plane deformation, maximum displacement along the z-axis).

TABLE 1

Relationship between Setting Angle of Power-Supply cable and Out-of-Plane Deformation.

| Setting Angle | 0° | 90° | 270° |
|---|---|---|---|
| Out-of-Plane Deformation | 0.7 mm | −1.3 mm | 1.4 mm |

As shown in Table 1, at the 0° setting, the out-of-plane deformation is sufficiently small. By contrast, at the 90° and 270° settings, the out-of-plane deformations are about twice the deformation at the 0° setting. Also, the out-of-plane deformations at the 90° and 270° settings are in mutually opposite directions. In this experiment, the terminal-to-terminal distance was 160 mm and L-bending was used. It is expected that when the distance is longer or U-bending is used, the resulting out-of-plane deformation will be larger.

The above result shows that even when an electric wire having a curling tendency is subjected to a straightening treatment, the curling tendency remains and its effect cannot be ignored. As already described, conventionally, when a bending motion is exerted on power-supply cables, the direction and amount of the out-of-plane deformation vary considerably from cable to cable. The above result explains the cause of this problem. That is, conventionally, the angle between the curling tendency direction of the electric wire used for a power-supply cable and the bending direction of the cable has not been adjusted in such a way as to reduce the problem.

As described above, the invention's power-supply cable including an electric wire has one or more curling tendency direction indicators showing the curling direction in which the electric wire tends to curl. Therefore, the curling tendency direction of the electric wire and the bending motion direction of the power-supply cable can be easily adjusted. As a result, even when a repetitive bending motion is exerted on a power-supply cable, the out-of-plane deformation of the cable and its cable-to-cable variation can be reduced.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. A power-supply cable comprising:
   an electric wire including an electrical conductor and a resin sheath covering the electrical conductor, the electric wire having a tendency to generate a curl under a no-load condition, the curl having a curling direction, the curling direction being a normal to the curl, the electric wire having one or more longitudinal ends;
   a connecting terminal disposed at one of the longitudinal ends of the electric wire; and
   a first curling tendency direction indicator showing the curling direction, the first curling tendency direction indicator being disposed along a normal line to the curl of the electric wire,
   wherein the first curling tendency direction indicator is disposed on a surface of the connecting terminal.
2. The power-supply cable according to claim 1, further comprising a second curling tendency direction indicator, wherein the second curling tendency direction indicator is disposed on a surface of the resin sheath.

* * * * *